United States Patent
Fultz et al.

(10) Patent No.: US 10,353,637 B1
(45) Date of Patent: Jul. 16, 2019

(54) MANAGING DATA STORAGE

(75) Inventors: Phillip P Fultz, Clinton, MA (US); Kiran Prakash Madnani, Framingham, MA (US); Manpreet Singh, Boxborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 236 days.

(21) Appl. No.: 13/340,945

(22) Filed: Dec. 30, 2011

(51) Int. Cl.
*G06F 12/02* (2006.01)
*G06F 3/06* (2006.01)

(52) U.S. Cl.
CPC .................. *G06F 3/0679* (2013.01)

(58) Field of Classification Search
None
See application file for complete search history.

(56) References Cited

U.S. PATENT DOCUMENTS

| | | | | |
|---|---|---|---|---|
| 5,636,355 A * | 6/1997 | Ramakrishnan | .... | G06F 12/0804 711/113 |
| 8,458,402 B1 * | 6/2013 | Karnik | ................ | G06F 12/0804 711/118 |
| 2003/0056059 A1 * | 3/2003 | Fox | ...................... | G06F 3/0601 711/112 |
| 2003/0056060 A1 * | 3/2003 | Hertz | .................... | G06F 3/0613 711/112 |
| 2006/0004957 A1 * | 1/2006 | Hand, III | ............ | G06F 12/0866 711/113 |
| 2009/0210620 A1 * | 8/2009 | Jibbe | ..................... | G06F 11/108 711/114 |
| 2010/0325356 A1 * | 12/2010 | Ash | ..................... | G06F 12/0804 711/113 |
| 2010/0332862 A1 * | 12/2010 | Lester | ..................... | G06F 1/30 713/300 |
| 2011/0066808 A1 * | 3/2011 | Flynn | ................. | G06F 12/0246 711/118 |
| 2011/0093651 A1 * | 4/2011 | Kurashige | ............ | G06F 3/0608 711/103 |
| 2011/0161557 A1 * | 6/2011 | Haines | ............... | G06F 12/0893 711/103 |
| 2012/0246403 A1 * | 9/2012 | McHale | ............... | G06F 3/0604 711/114 |

* cited by examiner

*Primary Examiner* — Charles Rones
*Assistant Examiner* — Ryan Dare
(74) *Attorney, Agent, or Firm* — Krishnendu Gupta

(57) ABSTRACT

A method and system for use in managing data storage is disclosed. Data storage in a data storage system is managed. The data storage system comprises a first cache and at least one solid state drive for storing data. The data storage in connection with the at least one solid state drive is monitored. The amount of free data storage capacity in connection with the at least one solid state drive is determined in response to monitoring the data storage in connection with the at least one solid state drive. At least a portion of the free data storage capacity is provisioned as a second cache in response to determining the amount of free data storage capacity in connection with the at least one solid state drive.

14 Claims, 4 Drawing Sheets

ND ATA STORAGE

MANAGING DATA STORAGE

TECHNICAL FIELD

The invention relates to managing data storage.

BACKGROUND OF THE INVENTION

A traditional storage system or storage array (herein also referred to as a "disk storage array", "disk array", or simply "array") is a collection of hard disk drives operating together logically as a unified storage device. Storage arrays are designed to store large quantities of data. Storage arrays typically include one or more storage array processors (SPs), for handling both requests for allocation and input/output (I/O) requests. An SP is the controller for and primary interface to the storage array.

The performance of storage arrays may be characterized by the arrays total capacity, response time, and throughput. The capacity of a storage array is the maximum total amount of data that can be stored on the array. The response time of an array is the amount of time that it takes to read data from or write data to the array. The throughput of an array is a measure of the amount of data that can be transferred into or out of (i.e., written to or read from) the array over a given period of time.

It will be known to those skilled in the art that storage arrays may use cache in order to improve the performance of the data storage system. The cache which may be implemented using a fast, volatile memory, such as RAM (random access memory), particularly dynamic RAM (DRAM), can store data enabling better performance. For example, the data storage array may temporarily cache data received from a host and destage the cached data at different times onto the physical disk drives. This technique is known as write-back caching. However, the problem with DRAM cache is that the storage capacity is low and the cost is high.

A further problem that may limit the performance of a storage array is the performance of each individual storage component. For example, the read access time of a disk storage array is constrained by the access time of the disk drive from which the data is being read. Read access time may be affected by physical characteristics of the disk drive, such as the number of revolutions per minute of the spindle: the faster the spin, the less time it takes for the sector being read to come around to the read/write head. The placement of the data on the platter also affects access time, because it takes time for the arm to move to, detect, and properly orient itself over the proper track (or cylinder, for multihead/multiplatter drives). Reducing the read/write arm swing reduces the access time. Finally, the type of drive interface may have a significant impact on overall disk array storage. For example, a multihead drive that supports reads or writes on all heads in parallel will have a much greater throughput than a multihead drive that allows only one head at a time to read or write data.

It will be known by those skilled in the art that in order to deal with at least some of these problems there has been an increase in the use of semiconductor solid state drives (also known as a solid state disks or SSDs) which may use flash memory as a storage device. Thus, in at least some cases there is a trend towards the use of SSDs as a storage device instead of a disk. Features that can make SSDs preferable as storage devices are, for example, a fast access rate, high throughput, a high integration density, and stability against an external impact. SSDs can move much larger amounts of data and process far more I/O requests, per time period, than conventional disks. This allows users to complete data transactions much more quickly.

In view of the above, it is common for data storage systems to have a combination of disks and SSDs for storing data. It is also common for high performance applications to use the SSDs as the performance capabilities of the SSDs are superior to those of the disks.

SUMMARY OF THE INVENTION

A method and system for use in managing data storage is disclosed. Data storage in a data storage system is managed. The data storage system comprises a first cache and at least one solid state drive for storing data. The data storage in connection with the at least one solid state drive is monitored. The amount of free data storage capacity in connection with the at least one solid state drive is determined in response to monitoring the data storage in connection with the at least one solid state drive. At least a portion of the free data storage capacity is provisioned as a second cache in response to determining the amount of free data storage capacity in connection with the at least one solid state drive.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
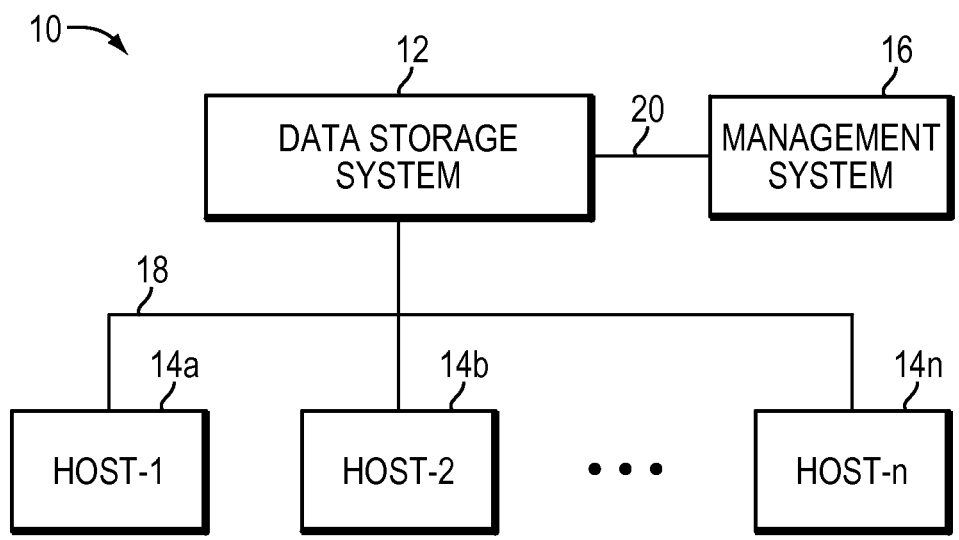
FIG. 1 is an example of an embodiment of a computer system that may utilize the technique described herein.

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described below is a technique for use in managing data storage. It will be appreciated that a user's needs in respect of a data storage system are dynamic. In some instances, there is a need for a large cache to provide sufficient performance in respect of frequently accessed data.

These caches are conventionally built using volatile DRAM memory. However, as discussed above, it is known that DRAM memory has a small storage capacity and is expensive.

At least one implementation in accordance with the technique described herein can leverage unused regions of solid state drives ("SSDs") in a data storage system as cache. If storage space on an SSD is required while provisioned as cache the technique can purge data therefrom and give at least a portion of the provisioned SSD back to the user as storage. As a result, the user may get a higher value from their storage resources in the data storage system.

One of the advantages that may result from at least some uses of the technique is that a user can get full value from the SSDs in the data storage system. Furthermore, it will be known that a user rarely fully utilizes the storage resources in the data storage system. At least one implementation in accordance with the technique described herein can utilize the unused regions of the SSDs and can deliver optimized performance. Additionally, in at least some cases, use of the technique can generally lower the cost of ownership of a data storage system.

Referring to FIG. 1, there is illustrated an example of an embodiment of a computer system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance.

In connection with an embodiment in which the data storage 12 is an appliance including hardware and software, the appliance may also include other software for performing different data services. For example, the appliance may include backup server software which interacts with software on the hosts 14a-14n when performing a backup operation.

It should be noted that although data storage system 12 is illustrated as a single data storage system, such as a single data storage array, data storage system 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. For example, the data storage array may be manufactured by a vendor, such as by EMC Corporation of Hopkinton, Mass. However, as will be appreciated by those skilled in the art, the techniques herein are applicable for use with other data storage arrays by other vendors and with other components than as described herein for purposes of example.

It will be known that the data storage system 12 may include a plurality of data storage devices. For example, the data storage devices may include one or more types of data storage devices such as one or more disk drives and/or one or more solid state drives (SSDs). An SSD is a data storage device that uses solid-state memory to store persistent data. SSD may refer to solid state electronics devices as distinguished from electromechanical devices, such as hard drives, having moving parts. Flash devices or flash memory-based SSDs are one type of SSD that contains no moving parts.

In one embodiment, the data storage devices in the data storage system may include a combination of disk drives and SSDs, such as flash devices, in which the flash devices may appear as standard Fibre Channel (FC) drives to the various software tools used in connection with the data storage system. The disk drives may be any one or more different types of disk drives such as, for example, an ATA disk drive, FC disk drive, and the like. The flash devices may be constructed using different types of memory technologies such as nonvolatile semiconductor NAND flash memory forming one or more SLC devices and/or MLC devices. Additionally, flash memory devices and disk drives are two exemplary types of devices that may be included in a data storage system used in connection with the technique described herein.

Figure 2:
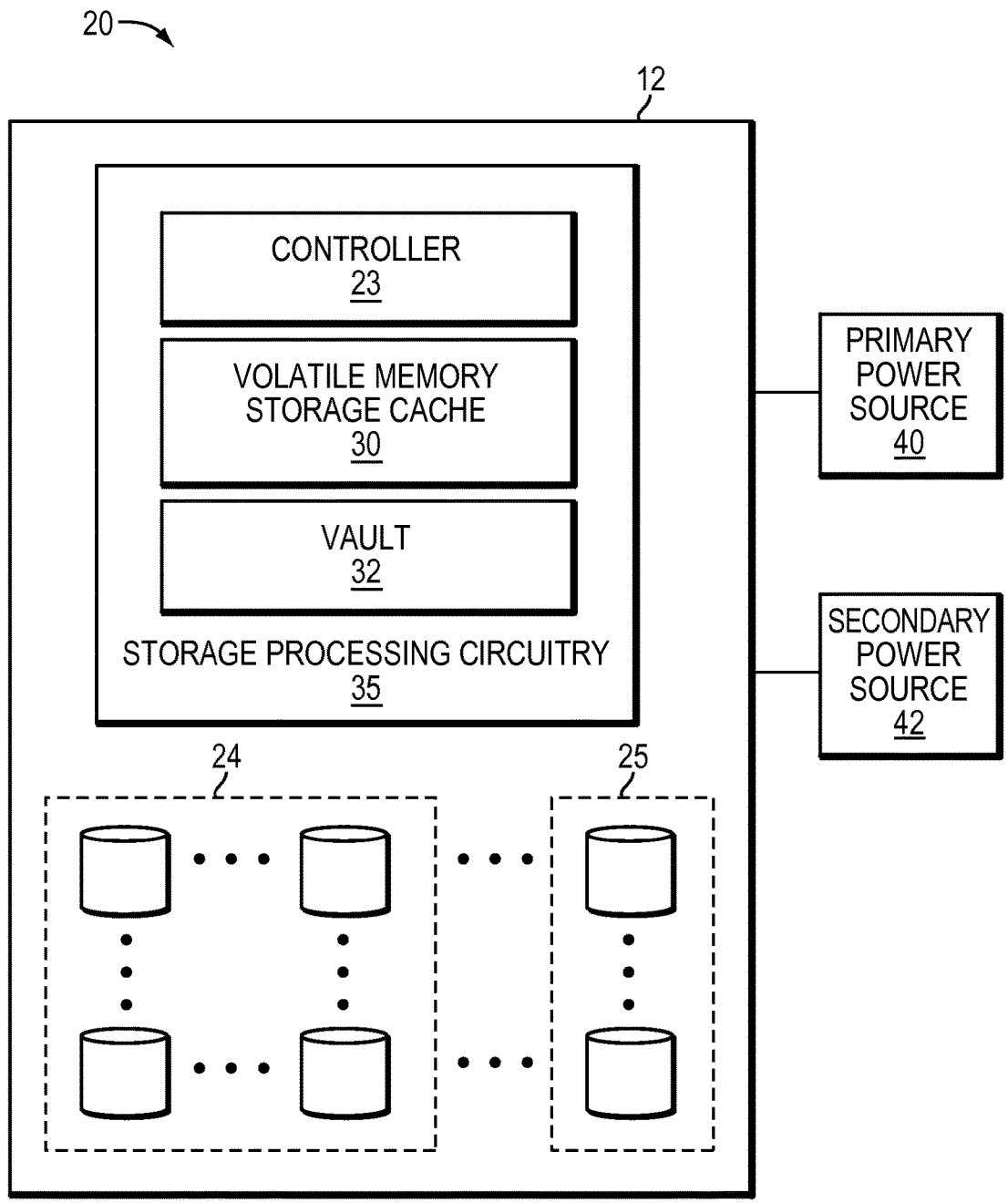
FIG. 2 is a diagram illustrating in more detail components in a data storage system that may be used in connection with the technique described herein.

Referring to FIG. 2, there is illustrated a block diagram of components in the data storage system that may be included in an embodiment using the techniques described herein. In the example 20, a data storage system 12 comprises data storage devices including disk drives 24 and solid state drives 25. The data storage system 12 also includes a controller 23, a first cache, namely, a volatile memory storage cache 30 and a vault 32. The example 20 also includes a primary power source 40 and an optional secondary power source 42. The primary power source may be configured to provide power to the data storage system 12 under normal operating conditions. The primary power source may be an external power source. The secondary power source may be, for example, a set of batteries configured to provide backup power to the storage processing circuitry 35 in the event of a loss of primary power from source 40. Upon the event of a loss of primary power, a signal may be sent to the data storage system by either the source 40 or the source 42 to indicate that backup power is being utilized.

The volatile memory (VM) storage cache 30 may comprise DRAM. The vault 32 may comprise non-volatile memory which can store data persistently. Upon the occurrence of an event, such as a power failure of the primary power source 40, the data storage system may perform a vaulting operation to copy contents of the volatile memory storage cache 30 to the vault 32.

The controller 23 may be configured to perform data storage operations on behalf of the hosts of FIG. 1 during normal operation using the volatile memory storage cache 30, the disks 24 and the solid state drives 25. As described above, when a host sends a request to write data to the data storage system, the controller 23 may store the data of the write request in the VM cache 30. At some point later, the data may be destaged or written out to the disks 24 or solid state devices 25 from the VM cache 30. The controller 23 may also be configured to perform the vaulting operation as described above copying any remaining portions of the volatile memory storage cache 30 which are currently not stored in nonvolatile memory to nonvolatile memory.

As will be appreciated by those skilled in the art, the data storage system 12 may also include other components than as described for purposes of illustrating the technique herein.

Figure 3:
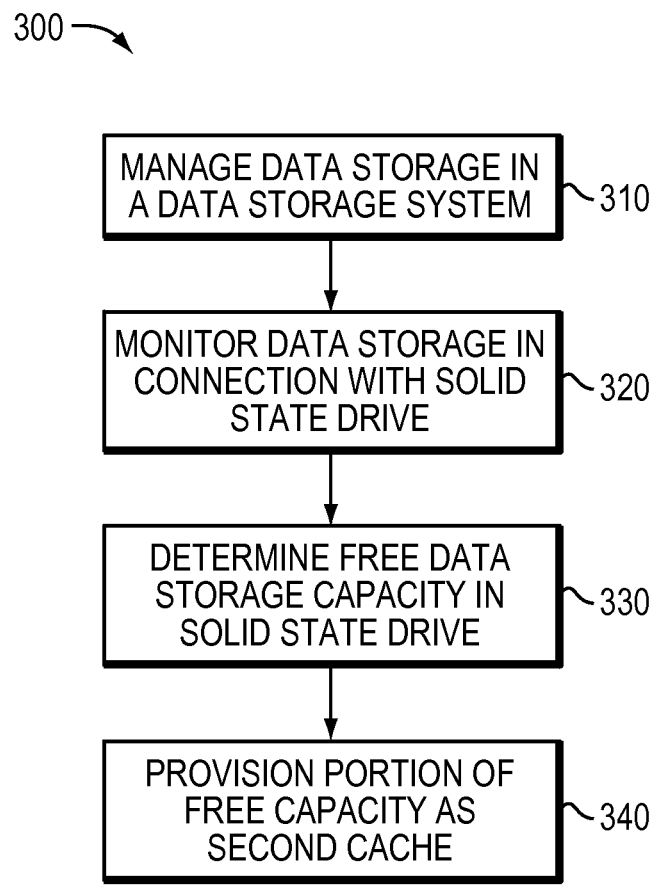
FIG. 3 is a flowchart of processing steps that may be performed in an embodiment in accordance with the technique described herein.

Referring to FIG. 3, there is illustrated a flowchart summarizing the steps of a technique 300 for managing data storage. The technique comprises managing 310 data storage in a data storage system. It will be appreciated that the aforementioned data storage system 12 of FIGS. 1 and 2 may be configured for performing the technique summarized in the flowchart and described herein. The data storage system comprising at least a first cache 30 and at least one solid state drive 25 for storing data. For example, the data storage system may comprise a first cache 30 comprising volatile DRAM memory. Furthermore, the system may comprise solid state drives 25 such as, for example, non-volatile flash devices. It will also be appreciated that the system may comprise disk drives 24 as well as solid state drives 25 for storing data in the backend of the data storage system. As discussed above, the solid state drives have superior performance characteristics to disk drives and may be used, for example, in connection with high performance applications. It will also be appreciated that the drives may be separated into tiers or pools depending on their performance characteristics. The technique comprises monitoring 320 the data storage in connection with the at least one solid state drive. In one embodiment, the solid state drives may be used in connection with high performance applications. It will be appreciated that the performance characteristics associated with the solid state drives are suitable for such applications. However, it will also be appreciated that the high performance applications or other applications may not fully utilize the storage capacity associated with the solid state drives. The technique as described herein comprises determining 330 the amount of free data storage capacity in connection with the at least one solid state drive in response to monitoring the data storage in connection with the at least one solid state drive. For example, the high performance applications or other applications associated with the solid state drives may only use a portion of the solid state drives leaving storage capacity not being utilized. The technique comprises provisioning 340 at least a portion of the free data storage capacity as a second cache in response to determining the amount of free data storage capacity in connection with the at least one solid state drive. It will be appreciated that in some instances a user may not wish the entire free data storage capacity to be provisioned as second cache. For example, the user may be aware that future data storage in the solid state drives may be required for the high performance application or other applications using the solid state drives. Therefore, for example, the user may require that at least ten percent of data storage is always free. Accordingly, if the high performance application or other applications are only using seventy percent of storage at a particular moment in time the technique may be configured for provisioning twenty percent of the storage in the solid state drives as second cache. The remaining ten percent may remain free enabling a user to use the free ten percent if future storage is required for the high performance application or other applications using the solid state drives. The above is provided as an example only and it will be appreciated that the amount of free storage capacity to be provisioned can be selectable set by a user. In one embodiment, the second cache may be configured such that the data in the first cache can be moved to the second cache. For example, the second cache may act as a second tier cache such that data in the first cache can be moved to the second cache in the event of the first cache reaching substantially maximum storage capacity. Accordingly, the data may be moved to the provisioned portion of the solid state drives or second cache instead of being moved to, for example, the disk drives in the back end. This enables the system to leverage the free capacity in the solid state drives to improve the overall performance of the data storage system. The technique also enables a much larger, scalable cache by using solid state drives, such as, for example, flash drives, which provide very large capacities per drive as compared to DRAM capacities. Capacities of flash drive may range up to 2 TB or more, which is considerably larger than the available DRAM cache of existing storage systems. The technique may also be configured such that at least a portion of the provisioned second cache can be re-provisioned as solid state drives for storing data in response to a request for further storage capacity in connection with the at least one solid state drive. It will be appreciated that when the second cache is re-provisioned as solid state drives the reclaimed storage may, for example, be used as a tier of storage or as a LUN. It will also be appreciated that the high performance application or other applications using the solid state drives may require further storage. For example, the further storage may be greater than the above example of ten percent. In such a scenario the second cache may purge or move at least a portion of the data in the second cache to the disks so that extra storage for the high performance application or other applications using the solid state drives can be provided.

In use, the flow of data may involve data received from the host being cached in the first cache. The data in the first cache may be moved to, for example, second cache in the event that the first cache has reached substantially maximum storage capacity. It will be appreciated that the data that is no longer required to be maintained in cache is moved to the second cache. For example, the data may not have been accessed as recent as other data in first cache requiring it to be moved. Additionally, it may be a write operation that is to be destaged. At some point later, the data in second cache may be destaged from the second cache to the disks. This approach enables greater performance from the data storage system by leveraging the free storage capacity of the solid state drives as second cache.

It is known that solid state drives such as flash memory devices are slower than DRAM cache but they are much faster than spinning disk drives making flash devices an extremely good candidate for caching data. It is also known, as discussed above, that the solid state drives are not typically fully utilized leaving storage resources unused. The technique as described herein leverages the unused portion of solid state drives as second cache to improve the performance of the data storage system. Additionally, the solid state drives such as flash devices provide large capacity at much lower cost than DRAM technologies and can be configured to provide additional functionality due to its non-volatile nature. The lower cost of solid state drives such as flash devices as compared to DRAM also means that more cache can be provided at reasonable cost making cache more effective and at least partially mitigating the lower speed.

It will also be appreciated that the second cache may improve the performance of random I/O intensive operations such as operations related to data deduplication. Disks have higher performance on sequential read or write operations than on random read or write operations, primarily because the latter require moving the hard disk's mechanical head, which takes significant time. Unlike disk, solid state drives such as flash based memory devices have little or no performance difference between sequential and random read or write operations. Accordingly, if an application needs to access data in many non-sequential locations on one or more disks, performance can be improved by having data in the second cache where it can be accessed without involving random read or write operations on disk.

Figure 4:
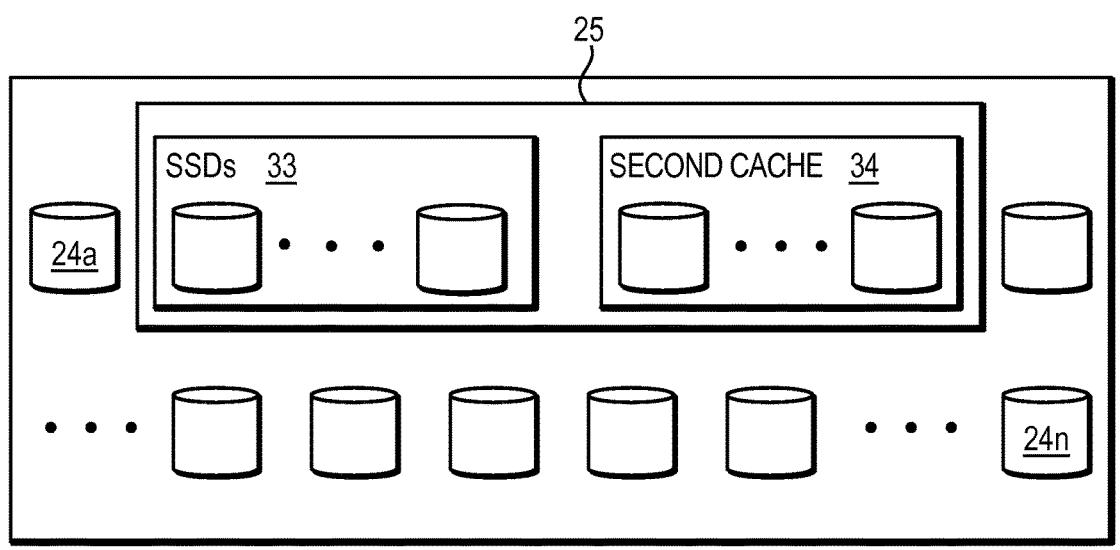
FIG. 4 is a diagram illustrating an example of components in a data storage system implementing the technique described herein.

Referring to FIG. 4, there is illustrated an example of components in a data storage system implementing the technique as described herein. The system comprises data storage devices including disk drives 24a-24n as well solid state drives such as flash devices 25. In the example, the technique provisions solid state drives as second cache 34. It will be appreciated from the aforementioned description of the technique that these solid state drives have been determined as having free storage capacity. The remaining solid state drives 33 will continue to store data in connection with, for example, high performing applications. It will be appreciated that the figure is an example only for illustration purposes.

While the invention has been disclosed in connection with preferred embodiments shown and described in detail, modifications and improvements thereon will become readily apparent to those skilled in the art. Accordingly, the spirit and scope of the present invention should be limited only by the following claims.

What is claimed is:

1. A method, comprising:
   storing data in a first cache in a data storage system, wherein the first cache comprises a volatile memory storage cache, further wherein the data storage system comprises a solid state drive;
   determining to move data from the first cache;
   determining an amount of free storage capacity in connection with the solid state drive, wherein the amount represents at least a portion of a total storage capacity in connection with the solid state drive;
   determining a differential between the amount of free storage capacity and a value representing an amount of storage capacity to remain free in connection with the solid state drive;
   provisioning the free storage capacity of the solid state drive such that a first portion of the free storage capacity forms a second cache comprising a nonvolatile memory storage cache and a second portion of the free storage capacity forms at least a part of non-cache storage of the solid state drive, wherein the size of the second cache that is provisioned is dependent on the differential, further wherein the size of the second portion that is provisioned is dependent on the value;

moving the data from the first cache to the second cache;

determining that extra storage capacity is required in the solid state drive, wherein the extra storage capacity cannot be satisfied by the non-cache storage of the data storage system;

and re-provisioning at least a portion of second cache such that the re-provisioned portion is added to the non-cache storage in order to satisfy the requirement for extra storage capacity in the solid state drive.

2. The method as claimed in claim 1, wherein the second cache is provisioned as a second tier cache such that at least a portion of the data in the first cache can be moved to the second cache in response to the first cache having reached maximum data storage capacity.

3. The method as claimed in claim 1, wherein at least a portion of the provisioned second cache can be re-provisioned as the at least one solid state drive in response to a request for further storage capacity in connection with the at least one solid state drive.

4. The method as claimed in claim 1, wherein the data storage system comprises the solid state drive and a disk drive for storing data, the performance characteristics associated with the solid state drive being superior to the performance characteristics associated with the disk drive so that the first portion of the free data storage capacity in connection with the solid state drive provisioned as the second cache also has performance characteristics superior to the performance characteristics associated with the disk drive.

5. The method as claimed in claim 1, wherein the first cache comprises volatile DRAM memory.

6. The method as claimed in claim 1, wherein the at least one solid state drive comprises non-volatile flash memory.

7. The method as claimed in claim 1, wherein the first portion of the free data storage capacity of the at least one solid state drive provisioned as the second cache comprises non-volatile flash memory.

8. A system, comprising:
a processor and memory;
the system configured to:
store data in a first cache in a data storage system, wherein the first cache comprises a volatile memory storage cache, further wherein the data storage system comprises a solid state drive;
determine to move data from the first cache;
determine an amount of free storage capacity in connection with the solid state drive, wherein the amount represents at least a portion of a total storage capacity in connection with the solid state drive;
determine a differential between the amount of free storage capacity and a value representing an amount of storage capacity to remain free in connection with the solid state drive;
provision the free storage capacity of the solid state drive such that a first portion of the free storage capacity forms a second cache comprising a non-volatile memory storage cache and a second portion of the free storage capacity forms at least a part of non-cache storage of the solid state drive, wherein the size of the second cache that is provisioned is dependent on the differential, further wherein the size of the second portion that is provisioned is dependent on the value;
move the data from the first cache to the second cache;
determine that extra storage capacity is required in the solid state drive, wherein the extra storage capacity cannot be satisfied by the non-cache storage of the data storage system; and
re-provision at least a portion of second cache such that the re-provisioned portion is added to the non-cache storage in order to satisfy the requirement for extra storage capacity in the solid state drive.

9. The system as claimed in claim 8, wherein the second cache is provisioned as a second tier cache such that at least a portion of the data in the first cache can be moved to the second cache in response to the first cache having reached maximum data storage capacity.

10. The system as claimed in claim 8, wherein at least a portion of the provisioned second cache can be re-provisioned as the at least one solid state drive in response to a request for further storage capacity in connection with the at least one solid state drive.

11. The system as claimed in claim 8, wherein the data storage system comprises the solid state drive and a disk drive for storing data, the performance characteristics associated with the solid state drive being superior to the performance characteristics associated with the disk drive so that the first portion of the free data storage capacity in connection with the solid state drive provisioned as the second cache also has performance characteristics superior to the performance characteristics associated with the disk drive.

12. The system as claimed in claim 8, wherein the first cache comprises volatile DRAM memory.

13. The system as claimed in claim 8, wherein the at least one solid state drive comprises non-volatile flash memory.

14. The system as claimed in claim 8, wherein the first portion of the free data storage capacity of the at least one solid state drive provisioned as the second cache comprises non-volatile flash memory.

* * * * *